United States Patent [19]

Oshiro et al.

[11] Patent Number: 4,617,885
[45] Date of Patent: Oct. 21, 1986

[54] BALANCER DEVICE FOR INTERNAL COMBUSTION ENGINES

[75] Inventors: Nobuaki Oshiro, Hamamatsu; Yorio Futakuchi, Shizuoka, both of Japan

[73] Assignee: Yamaha Hatsudoki Kabushiki Kaisha, Iwata, Japan

[21] Appl. No.: 382,428

[22] Filed: May 27, 1982

[30] Foreign Application Priority Data

May 29, 1981 [JP] Japan .................................. 56-82982

[51] Int. Cl.[4] ............................................ F02B 75/06
[52] U.S. Cl. .................................. 123/192 B; 74/603
[58] Field of Search ........... 123/192 B, 192 R, 195 A; 74/603

[56] References Cited

U.S. PATENT DOCUMENTS 4,174,698 11/1979 Dupin .............................. 123/192 R
4,195,613 4/1980 Bratt et al. ....................... 123/192 B

FOREIGN PATENT DOCUMENTS 0435367 11/1974 U.S.S.R. ........................... 123/192 B

Primary Examiner—Craig R. Feinberg
Assistant Examiner—David A. Okonsky
Attorney, Agent, or Firm—Ernest A. Beutler

[57] ABSTRACT

A balancing device for a V-type internal combustion engine in which the angle of the V is not equal to 90°. The balancing device comprises a shaft that is rotatable about an axis parallel to the axis of the crankshaft and which is driven at the same speed as the crankshaft but in the opposite direction. A first balancing mass is affixed to this shaft for balancing the first order inertial forces of the reciprocating masses of the cylinders and a pair of masses disposed on opposite sides of the first mass for balancing the couples generated by the offset of the connecting rods of the cylinders.

6 Claims, 14 Drawing Figures

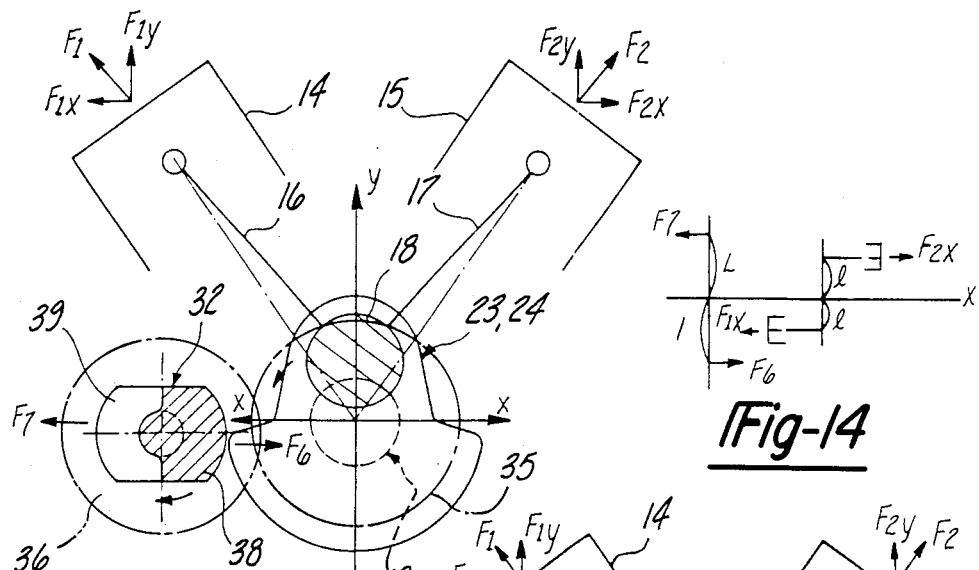
Fig-9
Fig-14
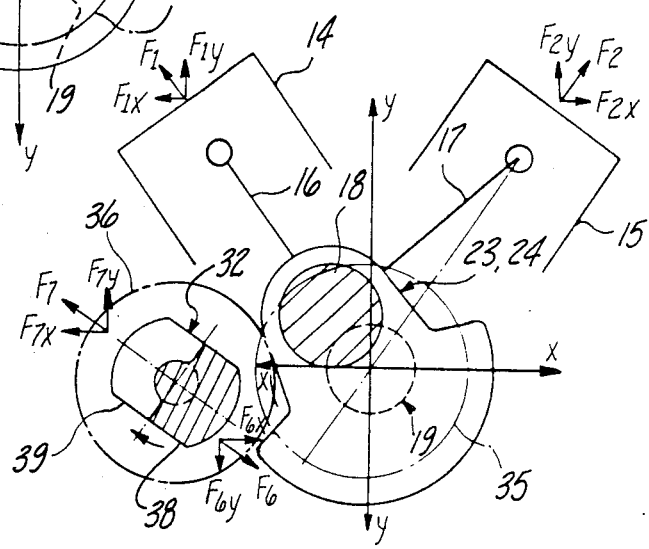
Fig-10
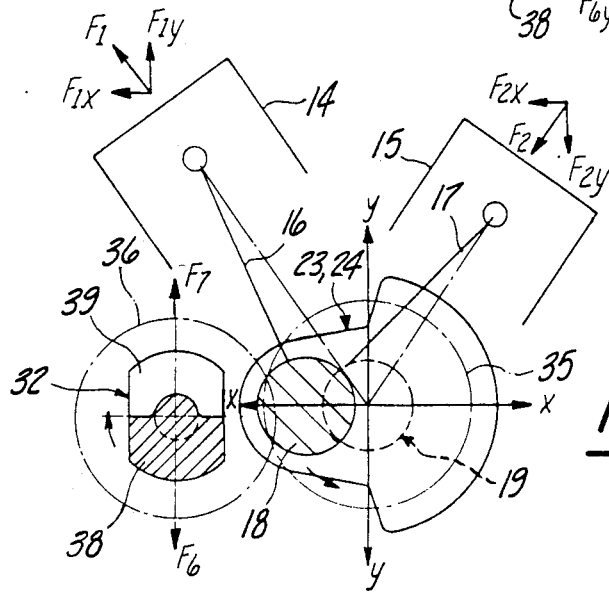
Fig-11

BALANCER DEVICE FOR INTERNAL COMBUSTION ENGINES

BACKGROUND OF THE INVENTION

This invention relates to a balancer device for internal combustion engines and more particularly to a balancer arrangement for V-type engines wherein the angle of the V is other than 90°.

As is well known, reciprocating internal combustion engines give rise to numerous unbalanced forces that can cause vibration. The reciprocation of the piston within the cylinder generates a first order inertial force in accordance with the reciprocating movement of the piston. This inertial force is exerted upon the crankshaft and can cause vibrations unless balanced. When an engine is configured with two cylinders having the pistons reciprocating at right angles to each other (90° V), some of the first order forces are balanced and engine vibrations reduced. On the other hand, in some instances, it is necessary or desirable to provide a V-type engine in which the cylinders are not disposed at right angles to each other. When this is done, the first order forces can be magnified rather than reduced.

In addition to the first order inertial forces in V-type engines, it is a common practice to offset one cylinder and connecting rod from that of the adjacent bank. This is frequently done so that the connecting rods can cooperate with a single throw of the crank. When offset connecting rods are employed, a force couple is also exerted on the crankshaft from the first order forces transmitted to it by the connecting rods. Of course, such force couples also can give rise to vibrations and shakes if not appropriately balanced.

It is well known to employ counterweights on the crankshaft throws so as to balance the first order inertial forces generated by the reciprocation of the pistons. In many instances, it is difficult or impossible to provide sufficient counterweighting directly on the crankshaft so as to dampen all first order forces. This problem is particularly acute when the engine is extremely compact, as is always desirable.

In addition to the provision of counterweighting for balancing first order forces, the force couple is normally balanced by two separate balancing devices. Thus, with engines of the V-type wherein the angle is other than 90°, the balancing system using prior art devices becomes extremely complicated and cumbersome.

It is, therefore, a principal object of this invention to provide an improved and simplified balancing arrangement for an internal combustion engine.

It is a further object of the invention to provide an engine balancing arrangement for a V-type engine wherein the angle between the cylinders is other than 90°.

It is a still further object of this invention to provide a compact, highly effective balancing system for a V-type engine that eliminates both first order and couple forces.

SUMMARY OF THE INVENTION

This invention is adapted to be used in an internal combustion engine having two cylinders arranged at a V with an included angle other than 90°. Pistons are supported in each of the cylinders and connecting rods connect each piston with a crankshaft that is supported for rotation in the engine. The connecting rods are offset axially relative to the crankshaft. In accordance with the invention, a balancer device is provided that includes a shaft member supported for rotation about an axis parallel to the axis of rotation of the crankshaft and which is driven at the same speed as the crankshaft but in the opposite direction. A weight on the shaft member is provided for balancing at least a portion of the first order forces generated by the reciprocation of the pistons. Other weights are formed on the crankshaft for eliminating the force couple generated from the axial offset of the connecting rods.

BRIEF DESCRIPTION OF THE DRAWINGS

FIGS. 9–13 are schematic views, in part similar to FIGS. 4–8, showing how the force couples are balanced.

FIG. 14 is a graphical analysis showing the couple effect.

DETAILED DESCRIPTION OF THE PREFERRED EMBODIMENT

Figure 1:
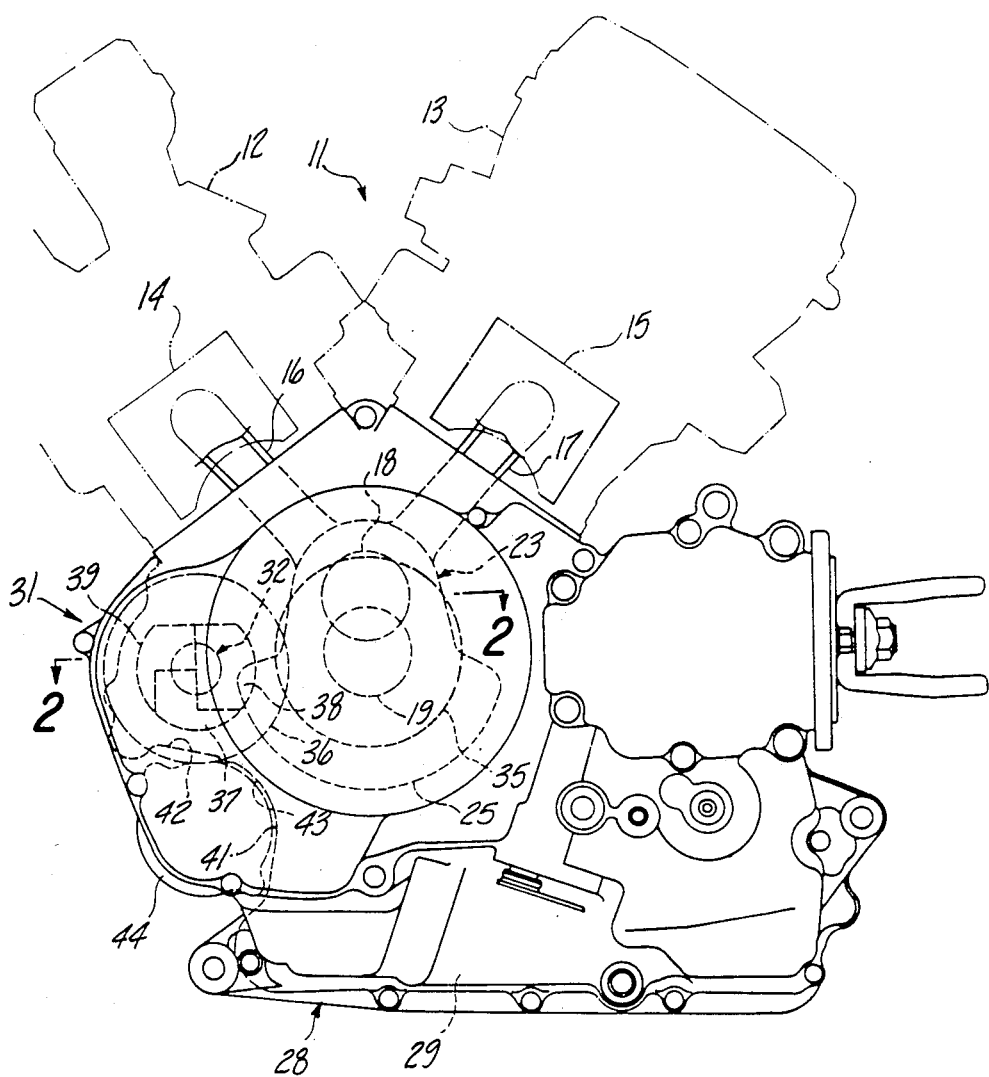
FIG. 1 is a side elevational view of an internal combustion engine constructed in accordance with this invention and showing certain of the elements in phantom.
Figure 2:
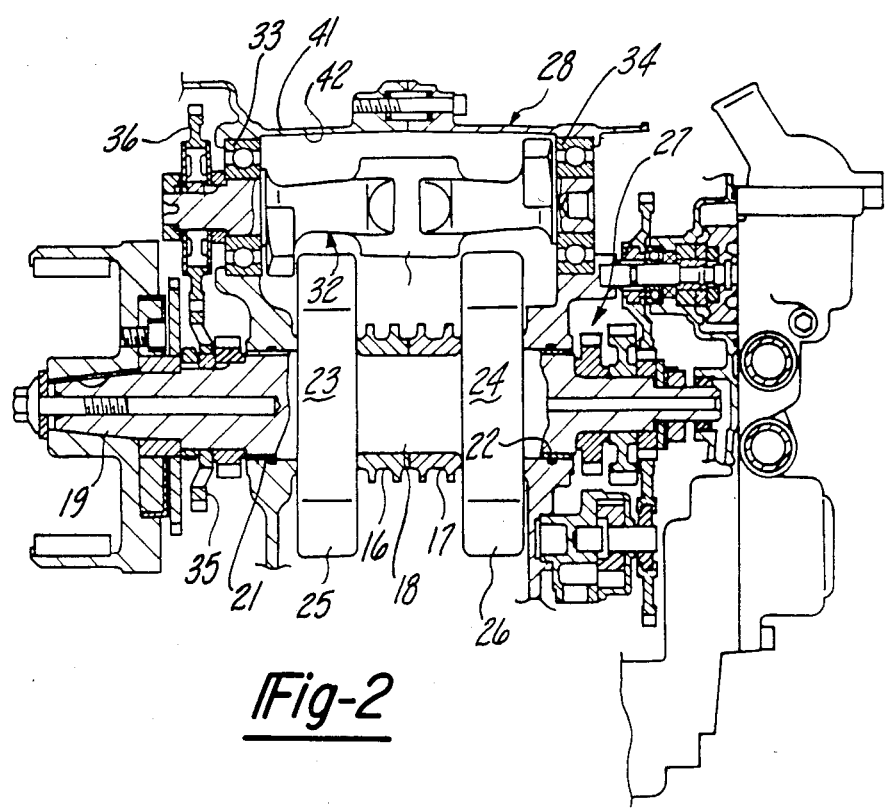
FIG. 2 is a cross-sectional view taken along the line 2—2 of FIG. 1.
Figure 3:
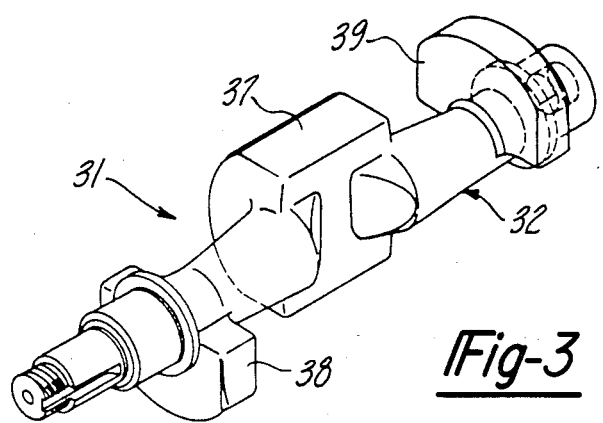
FIG. 3 is a perspective view showing the balancer shaft.

Considering first FIGS. 1–3, a V-type two cylinder engine constructed in accordance with this invention is identified generally by the reference numeral 11. The engine 11 includes angularly related cylinder blocks 12 and 13 having cylinder bores in which respective pistons 14, 15 are supported for reciprocation. The angle between the cylinder bores of the cylinder blocks 12 and 13 is other than 90° and in the illustrated embodiment is less than 90°. Connecting rods 16, 17 connect the pistons 14, 15 to a connecting rod journal 18 of a crankshaft 19. The crankshaft 19 is supported for rotation by the engine in a suitable manner, as by means of spaced main bearings 21, 22. The rod journal 18 is offset from the axis of rotation of the crankshaft 19 and is connected to the main bearing portions by means of respective throws or webs 23, 24. As is well known in this art, the webs 23, 24 are provided with counterbalancing masses 25, 26 to counterbalance the reciprocating forces exerted by the pistons 14, 15 and connecting rods 16, 17. In many instances, the size and configuration of the engine does not permit full balancing by means of the counterweights 25, 26.

In the illustrated embodiment, the crankshaft 19 drives a transmission mechanism, indicated generally by the reference numeral 27, that is disposed within a transmission case 28 that is formed with a portion of the overall engine assembly. In addition, this case also forms an oil sump 29 in which lubricant for the engine is contained.

Inasmuch as the included angle between the cylinders 12 and 13 is not 90°, the reciprocation of the pistons 14 and 15 will generate an unbalanced inertial force of the first order to the engine. Also, the axial offset of the connecting rods 16 and 17 on the crankshaft rod journal 18 will give rise to an unbalanced couple, both imbalances causing vibration and shake. In order to balance the first order inertial force and the couple, a balancing device, indicated generally by the reference numeral 31 is provided. The balancing device 31 consists of a balancing shaft 32 that is journalled for rotation in the engine crankcase about an axis that is parallel to the axis of rotation of the crankshaft 19, by means of bearings 33 and 34. The balancing shaft 32 is rotatably driven at a speed equal to the speed of rotation of the crankshaft 19 but in the opposite direction. For this purpose, a driving gear 35 is affixed to the crankshaft 19 and meshes with a driven gear 36 that is splined to the balance shaft 32. The balance shaft 32 is provided with an integral generally semi-cylindrical balancing mass 37 that is aligned with the crankshaft rod journal 18 and which is offset, in a direction to be described, so as to balance the first order unbalanced forces of the engine.

The balance shaft 32 is also provided with a pair of cylindrically-shaped balance masses 38 and 39 that are disposed immediately adjacent the bearings 33 and 34 and which are weighted and located in such a way as to effect balancing of the unbalanced couple generated by the axial offset of the connecting rods 16 and 17.

The driving arrangement for the balance shaft 32 is constructed so that the balance shaft and its drive will not cause any significant enlargement of the overall size of the engine. Located beneath the balance shaft drive gear 36 and the main portion of the shaft is a curved wall 41 of the side of the engine casting which defines a generally horizontally-extending surface 42 that extends beneath the shaft 32 and which will shield the shaft 32 and specifically its counterweights 37, 38 and 39 from contacting the oil in the oil sump 29 even if the oil level exceeds its normal level. The curvature of the wall 41 defines a recess 43 into which a starter 44 of the engine may be concealed. Thus, the layout of the balancer shaft 32 and the curvature of the wall 41 permits the compact placement of the starter 44 within the overall configuration of the engine 11 thus eliminating any extension in length which might otherwise be required.

Figure 4:
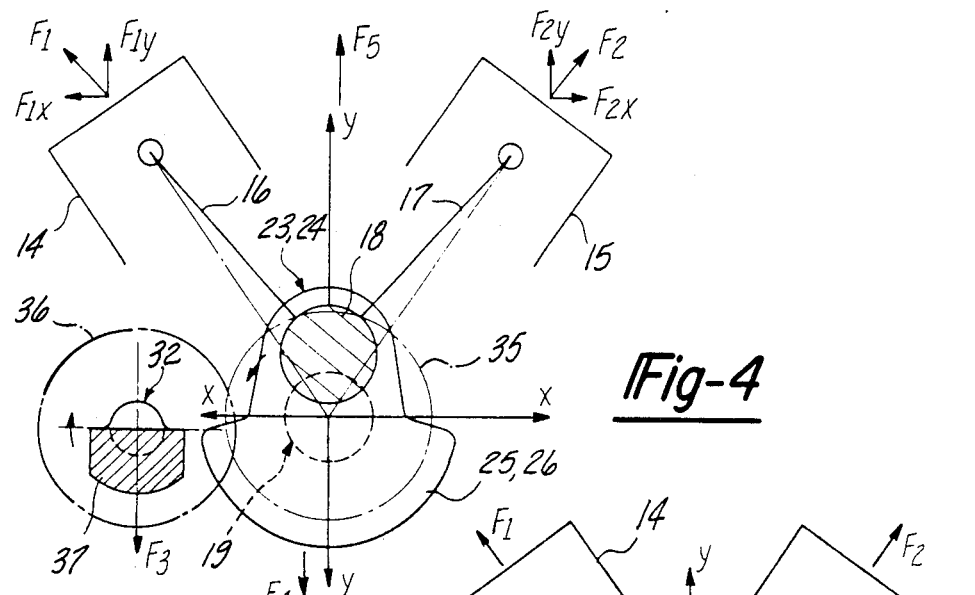
FIGS. 4–8 are schematic views of the engine at various angular positions of the crankshaft and demonstrate the manner in which the first order forces are balanced.

The operation of the balancer shaft 32 will be described now, first by reference to FIGS. 4-9 which illustrate how the inertial forces of first order are eliminated. FIG. 4 corresponds to the state, at which the piston 14 of the front cylinder 12 is positioned immediately before its top dead center and the piston 15 of the rear cylinder 13 is positioned immediately after its top dead center.

Their inertial forces of first order $F_1$ and $F_2$ instantaneously change in accordance with the crank rotational angle and have their values expressed by the following equations:

$$F_1 = \frac{w}{g} \cdot r \cdot \omega^2 \cos\left(\theta - \frac{\beta}{2}\right)$$

$$F_2 = \frac{w}{g} \cdot r \cdot \omega^2 \cos\left(\theta + \frac{\beta}{2}\right)$$

wherein:
w: the reciprocating weight associated with each cylinder;
η: the crank rotational angle;
β: the angle between the cylinders (0° < β < 180°, β ≠ 90°)
r: the crank radius; and
ω: the angular velocity of the crank.

The inertial forces of first order $F_1$ and $F_2$ of the respective pistons 14 and 15, which are exerted upwardly at that state are simplified in the following for $\theta = 0°$:

$$F_1 = \frac{w}{g} \cdot r \cdot \omega^2 \cos\left(-\frac{\beta}{2}\right) = F_2$$

However, the inertial forces $F_1$ and $F_2$ have their components $F_{1X}$ and $F_{2X}$ in the direction of an X-axis exerted in the opposite directions and thus eliminate each other.

As a result, the components $F_{1Y}$ and $F_{2Y}$ of the inertial forces of first order $F_1$ and $F_2$ in the direction of a Y-axis are exerted as a resultant force $F_5$ upon the crankshaft 1.

Specifically, those components $F_{1Y}$ and $F_{2Y}$ and the force $F_5$ are expressed by the following equations:

$$F_{1Y} = \frac{w}{g} \cdot r\omega^2 \cdot \cos\left(-\frac{\beta}{2}\right) \times \cos\frac{\beta}{2} = \frac{w}{g} r\omega^2 \cdot \cos\frac{\beta}{2}$$

$$F_{2Y} = \frac{w}{g} r\omega^2 \cdot \cos\left(-\frac{\beta}{2}\right) \times \cos\frac{\beta}{2} = \frac{w}{g} \cdot r\omega^2 \cdot \cos\frac{\beta}{2}$$

$$F_5 = 2\cos^2\frac{\beta}{2} \cdot \frac{w}{g} r \cdot \omega^2.$$

However, the weight 37 at the intermediate portion of the balancer shaft 32 and the counterweights 25 and 26 of the crank webs 23 and 24 are so positioned on the balancer shaft 32 and the crankshaft 19 as to protrude vertically downward so that they exert inertial forces $F_3$ and $F_4$ downward in the Y-axis direction, respectively.

Those inertial forces $F_3$ and $F_4$ are constant at all times if the rotational speed is constant. The inertial force $F_4$ is set in the present embodiment so that it is equal to the inertial force at the top and dead centers of the reciprocating weight associated with each cylinder, i.e., $(w/g) \cdot r \cdot \chi^2$. On the other hand, the other inertial force $F_3$ is so set as to satisfy $F_3 + F_4 = F_5$, as follows:

$$F_3 = F_5 - F_4 = \left(2\cos^2\frac{\beta}{2} - 1\right) \frac{w}{g} \cdot r \cdot \omega^2$$

$$= \frac{w}{g} \cdot r \cdot \omega^2 \cdot \cos\beta$$

Thus, the inertial forces $F_3$ and $F_4$ balance the resultant force $F_5$ of the aforementioned inertial forces of first order associated with the reciprocating weight ($F_1$ and $F_2$).

Figure 5:
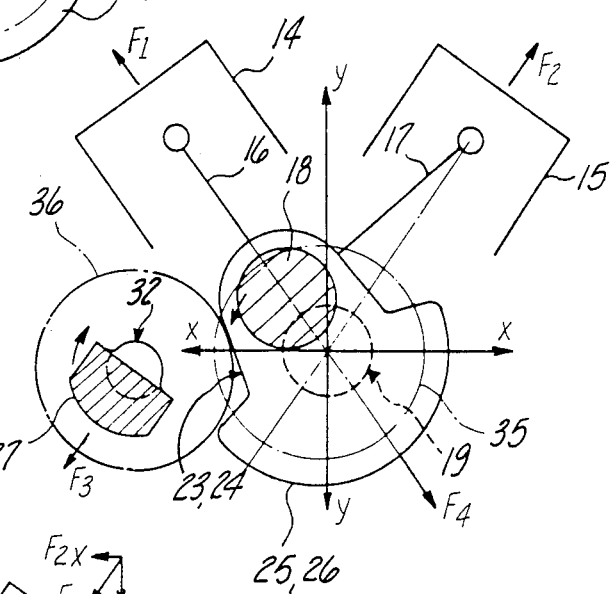

FIG. 5 illustrates the state at which the crankshaft 19 is rotated by $\theta = \beta/2$ in the direction of arrow from the state of FIG. 4 up to the instant when the piston 14 of the front cylinder 12 reaches its top dead center.

At this state, the inertial forces of first order $F_1$ and $F_2$ of the pistons 14 and 15 are respectively exerted upward with magnitudes as follows:

$$F_1 = \frac{w}{g} \cdot r \cdot \omega^2, F_2 = \frac{w}{g} \cdot r \cdot \omega^2 \cos\beta$$

The counterweights 25 and 26 are so positioned as to extend downward in the same direction as the axis of the front cylinder 12 from the crankshaft 19, whereas the weight 37 is so positioned as to extend downward in the same direction as the axis of the rear cylinder 13 from the balancer shaft 32. As a result, the inertia of first order $F_1$ of the piston 14 of the front cylinder 12 is balanced with and eliminated by the inertia $$F_4 = \frac{w}{g} \cdot r \cdot \omega^2$$

of the counterweights 25 and 26, whereas the inertia of first order $F_2$ of the piston 15 of the rear cylinder 13 is balanced with and eliminated by the inertia $$F_3 = \frac{w}{g} \cdot r \cdot \omega^2 \cos\beta$$

of the weight 37.

Figure 6:
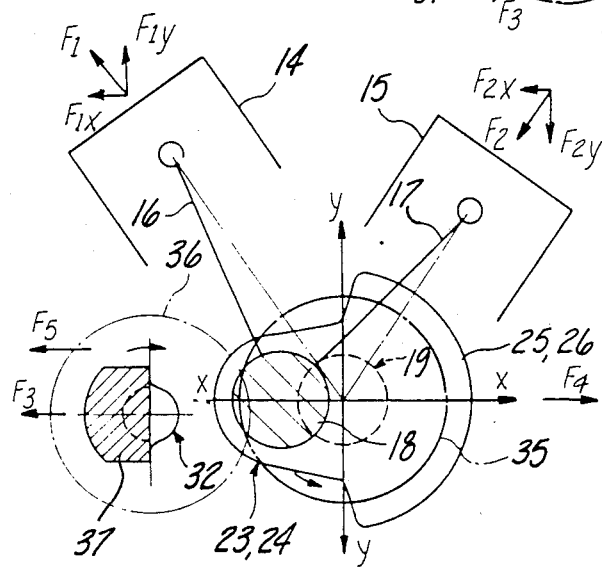

Next, FIG. 6 illustrates the state, at which the pistons 14 and 15 of the respective cylinders 12 and 13 are at their downward strokes and at which the crankshaft 19 is rotated by 90° in the direction of arrow from the state of FIG. 4.

At this state, the inertia of first order $$F_1 = \frac{w}{g} \cdot r\omega^2 \cdot \cos\left(\frac{\pi}{2} - \frac{\beta}{2}\right) = \frac{w}{g} \cdot r\omega^2 \cdot \sin\frac{\beta}{2}$$

of the piston 14 of the front cylinder 12 is exerted upward, whereas the inertia of first order $$F_2 = \frac{w}{g} \cdot r \cdot \omega^2 \cdot \cos\left(\frac{\pi}{2} + \frac{\beta}{2}\right) = \frac{w}{g} \cdot r \cdot \omega^2 \cdot \sin\frac{\beta}{2}$$

of the piston 15 of the rear cylinder 13 is exerted downward. The components $F_{1Y}$ and $F_{2Y}$ of those inertial forces of first order $F_1$ and $F_2$ in the Y-axis direction are equal and exerted in opposite directions so that they are eliminated.

As a result, the components $F_{1X}$ and $F_{2X}$ of the inertials of first order $F_1$ and $F_2$ in the X-axis direction are exerted as their resultant force $F_5$ upon the crankshaft 1, as follows:

$$F_5 = \frac{w}{g} r\omega^2 \sin\frac{\beta}{2} \cos\left(\frac{\pi}{2} - \frac{\beta}{2}\right) - \frac{w}{g} \cdot r \cdot \omega^2 \cdot \sin\frac{\beta}{2} \cdot$$

$$\cos\left(\frac{\pi}{2} + \frac{\beta}{2}\right) = 2 \cdot \frac{w}{g} \cdot r \cdot \omega^2 \sin^2\frac{\beta}{2} = \frac{w}{g} \cdot r \cdot \omega^2(1 - \cos\beta).$$

Since the weight 37 and the counterweights 25 and 26 are so positioned on the balancer shaft 32 and the crankshaft 19 as to extend in the opposite horizontal directions so that the inertias $F_3$ and $F_4$ in the X-axis direction are exerted in the opposite directions. Since the inertial equals $$F_4 = \frac{w}{g} \cdot r \cdot \omega^2$$

of the aforementioned counterweights 4a and 5a the sum of the inertia $F_3$ of the weight 37 and the resultant force $F_5$ of the inertias of first order $F_1$ and $F_2$ is balanced and eliminated as follows:

$$F_3 + F_5 = \frac{w}{g} \cdot r \cdot \omega^2 \cdot \cos\beta + \frac{w}{g} \cdot r \cdot \omega^2 \cdot (1 - \cos\beta)$$

$$= \frac{w}{g} \cdot r\omega^2 \cdot 1$$

Figure 7:
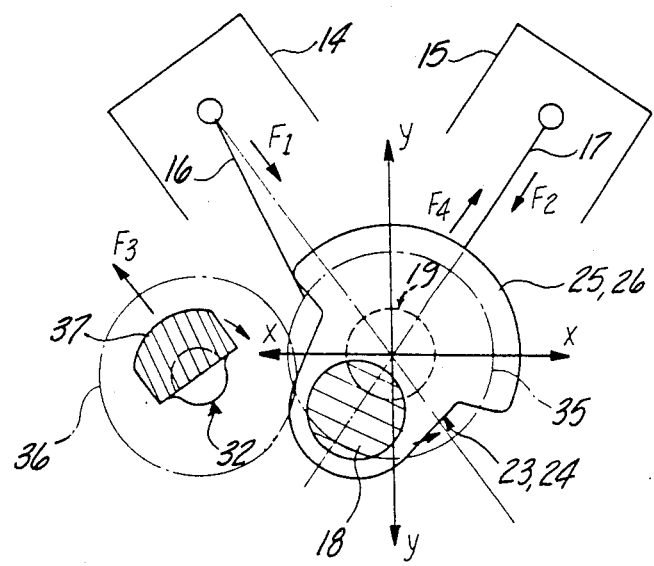

Next, FIG. 7 illustrates the state, at which the crankshaft 19 is rotated from the state of FIG. 6 until the piston 15 of the rear cylinder 13 reaches its bottom dead center.

At this state, the following inertias of first order $F_1$ and $F_2$ of the pistons 14 and 15 of the respective cylinders 12 and 13 are exerted downward for $\theta = \pi - (\beta/2)$:

$$F_1 = \frac{w}{g} r \cdot \omega^2 \cos\left(\pi - \frac{\beta}{2} - \frac{\beta}{2}\right) = -\frac{w}{g} \cdot r \cdot \omega^2 \cdot \cos\beta,$$

$$F_2 = \frac{w}{g} r \cdot \omega^2 \cos\left(\pi - \frac{\beta}{2} + \frac{\beta}{2}\right) = -\frac{w}{g} \cdot r \cdot \omega^2 \cdot 1$$

The weight 37 is so positioned on the balancer shaft 32 as to extend upward in the same direction of the axis of the front cylinder 12, and the counterweights 25 and 26 are positioned on the crankshaft 19 as to extend upward in the same direction of the rear cylinder 13. As a result, the inertia of first order $F_1$ of the piston 14 of the front cylinder 12 is balanced with and eliminated by the inertia $$F_3 = \frac{w}{g} \cdot r \cdot \omega^2 \cos\beta$$

of the weight 37, whereas the inertia of first order $F_2$ of the piston 15 of the rear cylinder 13 is balanced with and eliminated by the inertia $$F_4 = \frac{w}{g} \cdot r \cdot \omega^2$$

of the counterweights 25 and 26.

Figure 8:
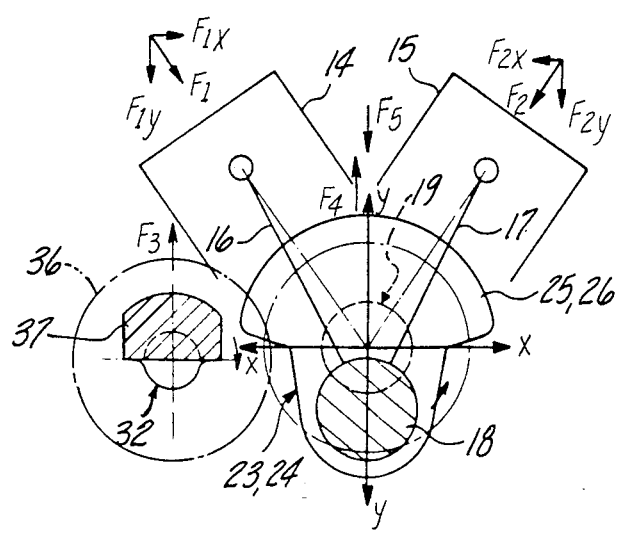

FIG. 8 illustrates the state, at which the crankshaft 19 is rotated by 180° from the state of FIG. 4 so that the piston 14 of the front cylinder 12 is positioned immediately before its bottom dead center whereas the piston 15 of the rear cylinder 13 is positioned immediately after its bottom dead center. At this state, the inertias of first order $F_1$ and $F_2$, and the inertias $F_3$ and $F_4$ of the weight 37 and the counterweights 25 and 26 are exerted in the opposite direction to that of the state of FIG. 4, but the resultant force $F_5$ of the inertias of first order $F_1$ and $F_2$ are balanced with and eliminated by the sum $F_3 + F_4$ of the inertias $F_3$ and $F_4$ of the weight 37 and the counterweights 25 and 26 as in the case of FIG. 4.

When the crankshaft 19 is rotated through the remaining 180° of its rotation, the inertias of first order $F_1$ and $F_2$, and the inertias $F_3$ and $F_4$ of the respective weights 37, 25 and 26 are exerted in the opposite directions to those of the states shown in FIGS. 5 to 7 so that they are balanced. These conditions are believed to be obvious from the preceding description and, hence are not illustrated.

FIGS. 9 to 13 illustrate the elimination of the force couple at crank angles similar to those of FIGS. 4 to 8. First of all, as illustrated in FIG. 9, since the Y-axis components $F_{1Y}$ and $F_{2Y}$ of the inertias of first order $F_1$ and $F_2$ are either equal to each other or exerted in the same direction, they exert no couple or moment upon the crankshaft 19 not the moment. This is not true, however, with respect to the X-axis components $F_{1X}$ and $F_{2X}$ of the inertias of first order $F_1$ and $F_2$. These force components do exert a couple on the crankshaft 19.

The weights 38 and 39 at both the sides of the balancer shaft 32 are positioned such that the weight at the side of the connecting rod 16 of the front cylinder 12 (the weight 38) is positioned on said shaft 32 so as to extend in the horizontal direction, i.e., in the X-axis direction toward the crankshaft 19, whereas the weight at the opposite side, i.e., the weight 39 is so positioned on the shaft 32 as to protrude in the opposite direction. As a result, inertias $F_6$ and $F_7$ of the respective weights 38 and 39 are exerted only in the X-axis direction upon the balancer shaft 32 so that a couple of forces is exerted in the opposite direction to that on the crankshaft 19. This couple of forces is balanced with that of the crankshaft 19, and the weights and offsets of those weights 38 and 39 are determined to satisfy that balancing condition. Thus, the couple of forces of the crankshaft 19 is balanced with and eliminated by that couple of forces of the balancer shaft 32. This is schematically illustrated in FIG. 14. In FIG. 14, letter 1 indicates the offset of the connecting rods 16 and 17 on the crankshaft 19, and letter L indicates the offset of the weights 38 and 39 on the balancer shaft 32.

In FIG. 10, the X-axis components $F_{1X}$ and $F_{2X}$ of the inertias of first order $F_1$ and $F_2$ exert an X-axis couple of forces upon the crankshaft 19, and the Y-axis components $F_{1Y}$ and $F_{2Y}$ exert a Y-axis couple of forces upon the crankshaft 19 due to the difference therebetween. The weights 38 and 39 are positioned on the balancer shaft 32 on opposite sides of a straight line parallel with the axis of the rear cylinder 13, so that the X-axis components $F_{6X}$ and $F_{7X}$ of those inertias $F_6$ and $F_7$ exert the couple of forces upon the balancer shaft 32 in the opposite direction to that of the aforementioned crankshaft 19. The Y-axis components $F_{6Y}$ and $F_{7Y}$ also exert a couple of forces in the opposite direction to that on the crankshaft 19. As a result, the X- and Y-axis couples of forces of the crankshaft 19 are respectively balanced with and eliminated by the couples of forces of the balancer shaft 32.

Next, in FIG. 11, since the X-axis components $F_{1X}$ and $F_{2X}$ of the inertias of first order $F_1$ and $F_2$ have the same magnitude and are exerted in the same direction there is no X-axis force couple exerted upon the crankshaft 19. However, the Y-axis components $F_{1Y}$ and $F_{2Y}$ of the inertias of first order $F_1$ and $F_2$ do exert a Y-axis couple on the crankshaft 19.

The weights 38 and 39 are positioned on the balancer shaft 32 so as to extend in the vertical direction, i.e., up and down in the Y-axis direction from said shaft 32 so that their inertias $F_6$ and $F_7$ are exerted only in the Y-axis direction to exert the couple of forces upon the balancer shaft 32 in the opposite direction to that of the aforementined crankshaft 19. As a result, the Y-axis couple of forces of the crankshaft 19 is balanced with and eliminated by that of the balancer shaft 32.

Figure 12:
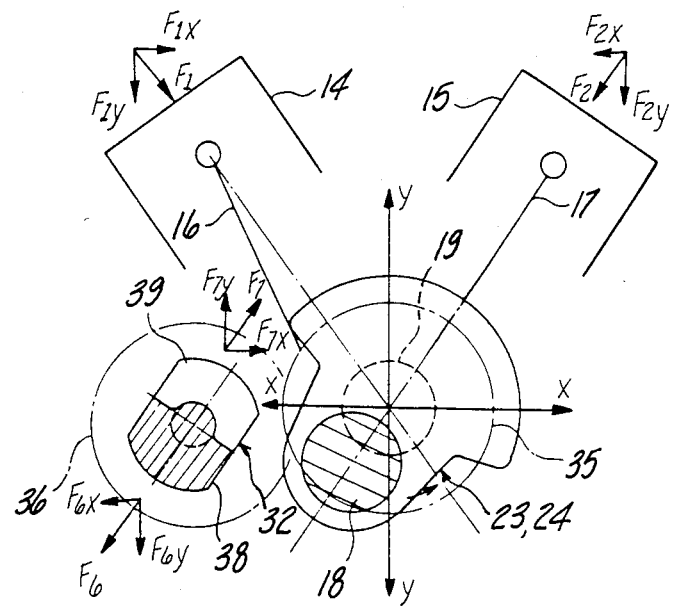

Next, in FIG. 12, the inertias of first order $F_1$ and $F_2$ and the inertias $F_6$ and $F_7$ of the weights 38 and 39 are exerted in the opposite direction to the case of FIG. 10, and the X- and Y-axis couples of forces of the crankshaft 19 are eliminated by that of the balancer shaft 32 in the opposite sense.

Figure 13:
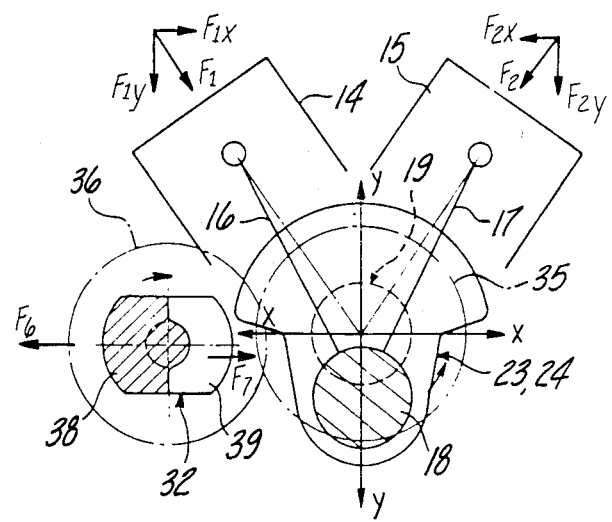

In FIG. 13 the direction of forces is reversed from the case of FIG. 9, but the balancing effect is similar so that its explanation is omitted here.

The condition for the remaining 180° of rotation of the crankshaft 19 is such that the direction of forces is reversed from the case of FIGS. 9 to 13, but is otherwise similar to these figures so that its illustration and description is omitted.

It should be readily apparent from the foregoing description that a relatively simple compact arrangement has been provided for balancing the first order inertial forces and the force couples on a V-type engine. This is done by means of a single balancer shaft as aforedescribed. Various changes and modifications may be made without departing from the spirit and scope of the invention, as defined by the appended claims.

We claim:

1. In an internal combustion engine having at least two cylinders arranged in the shape of a "V" at an included angle other than 90°, pistons in said cylinders, a crankshaft supported for rotation, and connecting rods connecting each of said pistons with said crankshaft, said connecting rods being offset in the axial direction of said crankshaft, the improvement comprising a balancer device comprising only one shaft member supported for rotation about an axis parallel to the axis of rotation of said crankshaft, means for driving said shaft member at the same speed as said crankshaft but in the opposite direction; a first weight on said shaft member for balancing at least a portion of the force of first order which is generated by the reciprocal movements of said pistons; and further weights formed on said shaft member for eliminating the force couple generated from the axial offset of said connecting rods.

2. An internal combustion engine as set forth in claim 1 wherein the first weight is disposed on the shaft member between a pair of weights, said pair of weights comprising the further weights.

3. An internal combustion engine as set forth in claim 2 wherein the pair of weights comprise a pair of weights eccentrically disposed relative to the axis of rotation of the shaft member, each weight of said pair being positioned on the opposite side of a plane passing through the axis of rotation of said shaft member from the other.

4. An internal combustion engine as set forth in claim 1 wherein the crankshaft is formed with counterbalancing means, the crankshaft counterbalancing means being effective to balance only a portion of the first order forces exerted by the pistons.

5. An internal combustion engine as set forth in claim 4 wherein the crankshaft counterbalancing means balances the reciprocating mass associated with one of the cylinders, the first weight on the shaft member being disposed and weighted so as to balance the first order mass of the first order reciprocating mass associated with the other cylinder.

6. An internal combustion engine as set forth in claim 5 wherein the further weights comprise a pair of weights disposed on opposite sides of the first weight and having an axially offset and mass equal to the force couple exerted upon the crankshaft by the offset of the connecting rods.

* * * * *